United States Patent Office 3,075,014
Patented Jan. 22, 1963

3,075,014
BASIC SUBSTITUTED ALKOXY DIPHENYLALKANOLS, DIPHENYLALKENES AND DIPHENYLALKANES
Frank Patrick Palopoli, Cincinnati, Vernon John Feil, Glendale, and Harvey Douglas Benson, Cincinnati, Ohio, assignors to Richardson-Merrill, Inc., a corporation of Delaware
No Drawing. Filed June 14, 1960, Ser. No. 35,907
8 Claims. (Cl. 260—570)

This invention relates to new and useful chemical compounds which possess useful physiological properties and to a process for the preparation of these compounds.

The new compounds of the present invention may be regarded as basic substituted alkoxy diphenylalkanols, diphenylalkenes, and diphenylalkanes. They may be represented by the formula:

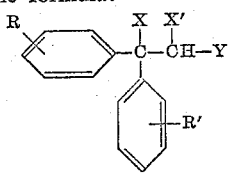

in which one of the groups represented by R and R' is a basic ether group of the formula $-OC_nH_{2n}A$, in which A is a dialkylamino- or a monocyclic nitrogen-containing heterocyclic group. The dialkylamino groups contain alkyl groups of from one to four carbon atoms, while the monocyclic heterocyclic groups include the morpholino and piperidino groups. $n$ is an integer from two to four. The remaining R and R' group may be hydrogen, lower alkyl, halogen, lower alkoxy or trifluoromethyl. Y is a straight or branched alkyl or alkylene group containing from two to fifteen carbon atoms, inclusive; X may be hydrogen or hydroxyl and X' is hydrogen or together X and X' form a second bond between the carbon atoms to which they are attached.

This invention also includes the acid addition salts of the compounds of the general formula.

The new and novel alkanols have the formula:

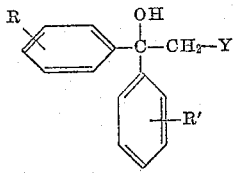

wherein R, R', and Y have the meanings described above. The alkanols may be prepared by reacting an alkyl magnesium halide or a lithium alkyl with a benzophenone substituted with the R and R' groups. The ketone is obtained by reacting an alkali metal salt of a substituted hydroxyphenyl ketone with a dialkylaminoalkyl halide, such as diethylaminoethyl chloride.

The following scheme illustrates the preparation of the alkanols:

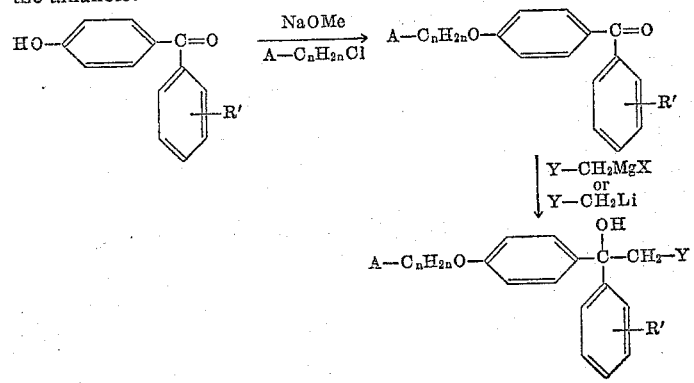

The new and novel alkylenes of this invention have the formula:

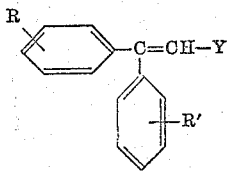

wherein R, R', and Y have the meanings described above. The new alkylenes are prepared by dehydration of the above alkanols by use of mineral acids such as hydrochloric or phosphoric acids.

The new alkanes of this invention have the formula:

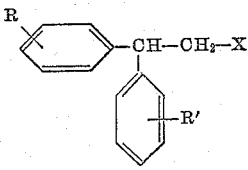

wherein R, R' and Y have the meanings described above. The new alkanes are prepared by hydrogenation of the above alkylenes.

The new compounds of the present invention possess useful physiological activity, particularly in blocking the formation of cholesterol in the body. These compounds are, therefore, useful in the treatment of hypercholesteremia and in cardiovascular diseases aggravated by high blood levels of cholesterol. They are effective orally or parenterally and may be administered in doses ranging from 25 mg. to 4 grams daily depending upon the condition under treatment and as determined by the attending physician. When given orally they may be in the form of capsules or tablets which may, if desired, be enterically coated. They can also be administered as oral suspensions or liquids. Injectable solutions may be prepared in conventional manner using isotonic saline, if desired.

These new compounds also have endocrine activity and are useful as anti-inflammatory agents and as estrogenic and anti-estrogenic agents. As will also be apparent, the ethanols and ethylenes are useful as intermediates in the preparation of the ethylenes and ethanes respectively.

Some presently known anti-cholesterol agents function by blocking the formation of cholesterol at a late stage in its biochemical synthesis. This, however, results in the accumulation of another sterol known as desmosterol. The compounds of the present invention appear to block the formation of cholesterol by another mechanism in which cholesterol synthesis is blocked at an early stage before formation of the sterol structure. The non-sterols which result from this blocking process are more easily metabolized and excreted than are the sterols. This, of course, is an unexpected and advantageous property of the new compounds of the invention.

EXAMPLE 1

1-[p-(β-Diethylaminoethoxy)Phenyl]-1-p-Tolylheptanol

A mixture of 210 g. of p-hydroxy-p'-methylbenzophenone, 55 g. of powdered sodium methoxide and 400 ml. of ethanol was stirred for thirty minutes. A solution of 150 g. of β-diethylaminoethyl chloride in 300 ml. of toluene was added, and the mixture was refluxed four hours. The solvent was removed, the residue was taken up in ether, extracted with ten percent NaOH solution, twice with water, the ether removed, and the residue was distilled. The product, p - (β - diethylaminoethoxy)-p'-methylbenzophenone, was obtained as an oil boiling at about 232° C. at 0.6 mm.

An ether solution containing 20 g. (0.064 mole) of p-(β-diethylaminoethoxy) - p' - methylbenzophenone was added to an ether solution containing 0.09 mole of n-hexylmagnesium bromide. The mixture was refluxed for two hours, and the complex was decomposed with a solution of ammonium chloride. The organic layer was removed and dried over magnesium sulfate. The oil that remained upon removal of the solvent was converted to the dihydrogen citrate salt, using 12.3 g. (0.064 mole) citric acid, and recrystallized three times from butanone. The salt was converted to the free base, and it was recrystallized once from low boiling petroleum ether to give 5 g. of 1-[p-(β-diethylaminoethoxy)phenyl]-1-p-tolylheptanol melting at 57–59° C. This compound appears to be the most active anti-cholesterol agent of the invention.

EXAMPLE 2

1-[p-(β-Diethylaminoethoxy)Phenyl]-1-p-Tolylheptanol

Three hundred ml. of a stock solution of n-hexyl lithium was prepared from 82.5 g. (0.5 mole) of n-hexyl bromide and 7.0 g. of lithium wire at −30° C. Fifty ml. of a 1.37 molar solution of n-hexyl lithium in ether was added to 15.5 g. (0.05 mole) of p-(β-diethylaminoethoxy)-p'-methylbenzophenone in 200 ml. of ether. The reaction mixture was allowed to stir for one hour then decomposed with water and the ether layer separated. After washing with water, the ether layer was dried over magnesium sulfate. After removal of the solvent, the residual oil was crystallized from petroleum ether (B.P. 40–60° C.) to give 13.5 g. of 1-[p-(β-diethylaminoethoxy)phenyl]-1-p-tolylheptanol, melting at 57–59° C.

EXAMPLE 3

1-[p-(β-Diethylaminoethoxy)Phenyl]-1-p-Tolylpentanol

An ether solution containing 15.6 g. (0.05 mole) of p-(β-diethylaminoethoxy) - p' - methylbenzophenone was added to a 0.1 mole ether solution of n-butyl magnesium bromide. The complex was decomposed with a solution of ammonium chloride. The organic layer was collected and dried over potassium carbonate. The ether was removed, and the residue crystallized from low boiling petroleum ether to yield 8.5 g. of 1-[p-(β-diethylaminoethoxy)phenyl]-1-p-tolylpentanol, melting at 64.5–66° C.

EXAMPLE 4

1-[p-(β-Diethylaminoethoxy)Phenyl]-1-p-Chlorophenyl-4-Methyl-1-Pentanol

When p-hydroxy-p'-chlorobenzophenone replaced p-hydroxy-p'-methylbenzophenone in Example 1, p-(β-diethylaminoethoxy)-p'-chlorobenzophenone was obtained, melting at 79–80° C. (from ethanol). This ketone, when treated with isoamyl magnesium bromide and the reaction worked up as described in Example 1, yielded 1-[p-(β-diethylaminoethoxy)phenyl]-1-p-chlorophenyl-4 - methyl-1-pentanol melting at 64–66° C.

EXAMPLE 5

1-[p(β-Diethylaminoethoxy)Phenyl]-1-p-Tolyldecanol

An ether solution of nonyl lithium was prepared from 24.8 g. (0.12 mole) of n-nonyl bromide and 1.7 g. of lithium at −20° C. To this solution was added 31 g. (0.1 mole) of p-(β-diethylaminoethoxy)-p'-methylbenzophenone dissolved in ether. The reaction mixture was decomposed with water, and the ether layer collected and dried over potassium carbonate. The ether was removed, yielding 31 g. of oil. Ten grams of this oil was converted to the dihydrogen citrate salt and recrystallized from ethyl acetate, yielding 5 g. of 1-[p-(β-diethylaminoethoxy)phenyl]-1-p-tolyldecanol dihydrogen citrate melting at 102–104° C.

EXAMPLE 6

1-[p-(β-Diethylaminoethoxy)Phenyl]-1-p-Tolylheptadecanol

When the procedure of Example 5 is followed, using n-cetyl lithium in place of n-nonyl lithium, 1-[p-(β-diethylaminoethoxy)phenyl] - 1 - p - tolylheptadecanol was obtained as an oil whose dihydrogen citrate salt melted at 108–110° C.

EXAMPLE 7

1-[p-(β-Diethylaminoethoxy)Phenyl]-1-p-Tolyldecene-1

An excess of alcoholic hydrogen chloride was added to 20 g. of 1-[p-(β-diethylaminoethoxy)phenyl]-1-p-tolyldecanol (Example 5) and the solution refluxed for one hour. The solvent was removed and 10 g. of the hydrochloride salt neutralized with a ten percent sodium hydroxide solution. The free amine was dissolved in ether and dried over potassium carbonate. The ether was removed and the residue converted to the dihydrogen citrate salt and recrystallized from butanone yielding 1-[p-(β-diethylaminoethoxy)phenyl]-1-p-tolyldecene - 1 dihydrogen citrate melting at 119–121° C.

EXAMPLE 8

1-[p-(β-Diethylaminoethoxy)Phenyl]-1-p-Tolyldecane

Ten grams of 1-[p-(β-diethylaminoethoxy)phenyl]-1-p-tolyldecene-1 hydrochloride was dissolved in 100 ml. ethanol and hydrogenated at fifty pounds of hydrogen pressure using platinum oxide catalyst. After the theoretical amount of hydrogen was absorbed, the catalyst was removed by filtration, and the solvent removed. The residue was converted to the free base, and the dihydrogen citrate salt of 1-[p-(β-diethylaminoethoxy)phenyl]-1-p-tolyldecane was prepared in butanone. The salt melted at 119–120° C.

EXAMPLE 9

1-[p-(γ-Piperidinopropoxy)Phenyl]-1-p-Tolylheptanol

When p-(γ-piperidinopropoxy)-p'-methylbenzophenone replaced p-(β-diethylaminoethoxy) - p' - methylbenzophenone in Example 2, there was obtained 1-[p-(γ-piperidinopropoxy)phenyl]-1-p-tolylheptanol melting point 88–89° C.

EXAMPLE 10

1-[p-(β-Morpholinoethoxy)Phenyl]-1-p-Tolylheptanol

When p-(β-morpholinoethoxy)-p'-methylbenzophenone replaced p-(β - diethylaminoethoxy)p'-methoxybenzophenone in Example 2, there was obtained 1-[p-(β-morpholinoethoxy)phenyl]-1-p-tolylheptanol, melting point 85–86° C.

EXAMPLE 11

1-[p-(β-Diethylaminoethoxy)Phenyl]-1-m-Trifluoromethylphenylheptanol

When p-(β-diethylaminoethoxy) - m' - trifluoromethylbenzophenone replaced p - (β - diethylaminoethoxy) - p'-methylbenzophenone in Example 2, there was obtained 1-[p-(β-diethylaminoethoxy)phenyl] - 1-m-trifluoromethylphenylheptanol, melting point 91–92.5° C.

EXAMPLE 12

1-[p-(β-Dimethylaminoethoxy)Phenyl]-1-Phenylnonanol

When p-(β-dimethylaminoethoxy)benzophenone and n-octyllithium replaced p-(β-diethylaminoethoxy)-p'-methylbenzophenone and hexyllithium in Example 2, there was obtained 1-[p-(β-dimethylaminoethoxy)phenyl]-1-phenylnonanol, melting at 64–65° C.

EXAMPLE 13

1-[p-(β-Diethylaminoethoxy)Phenyl]-1-p-Methoxyphenyloctanol

When p-(β-diethylaminoethoxy)-p'-methoxybenzophenone and n-heptyllithium replaced p-(β-diethylaminoethoxy)-p'-methylbenzophenone and hexyllithium in Example 2 there was obtained 1-[p-(β-diethylaminoethoxy)-phenyl]-1-p-methoxyphenyloctanol, as the dihydrogen citrate salt, melting at 95–97° C.

EXAMPLE 14

1-[p-(β-Diethylaminoethoxy)Phenyl]-1-p-Tolylheptene-1

When 1-[p-(β-diethylaminoethoxy)phenyl]-1-p-tolylheptanol (Example 2) replaced 1-[p-(β-diethylaminoethoxy)phenyl]-1-p-tolyldecanol in Example 7 there was obtained 1-[p-(β-diethylaminoethoxy)phenyl]-1-p-tolylheptene-1 as the dihydrogen citrate salt, melting at 118–120° C.

EXAMPLE 15

1-[p-(β-Diethylaminoethoxy)Phenyl]-1-p-Tolylheptane

When 1-[p-(β-diethylaminoethoxy)phenyl]-1-p-tolylheptene-1 (Example 14) replaced 1-[p-(β-diethylaminoethoxy)phenyl]-1-p-tolyldecene-1 in Example 8 there was obtained 1-[p-(β-diethylaminoethoxy)phenyl]-1-p-tolylheptane, as the dihydrogen citrate salt, melting at 120–122° C.

EXAMPLE 16

1-[p-(β-Dimethylaminoethoxy)Phenyl]-1-Phenyl-3-Buten-1-Ol

An ether solution of allyl magnesium bromide, prepared from 12.2 g. (0.1 M) of allyl bromide and 15 g. (0.6 g. at.) of magnesium powder, was added to 13.5 g. (0.05 M) of p-(β-dimethylaminoethoxy)benzophenone dissolved in ether and the mixture refluxed for one hour. The reaction mixture was then decomposed with a solution of ammonium chloride and the ether layer collected. The ether was dried over magnesium sulfate, filtered and the solvent removed. The residue was crystallized from a mixture of ether-petroleum-ether (B.P. 40–60) yielding 13.5 g. of 1-[p-(β-dimethylaminoethoxy)phenyl]-1-phenyl-3-buten-1-ol, melting at 100–102° C. This compound has an anti-cholesterol activity comparable with that of the compound of Example 1.

We claim:

1. A compound of the formula

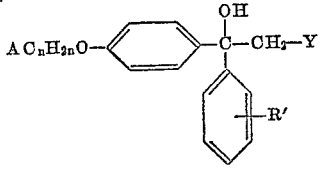

in which A is a member of the group consisting of diloweralkylamino, piperidino, and morpholino, n is an integer from 2 to 4, R' is selected from the group consisting of hydrogen, lower alkyl, halogen, lower alkoxy and trifluoromethyl and Y is a radical of the group consisting of alkyl and alkenyl having from two to fifteen carbon atoms.

2. A compound of the formula

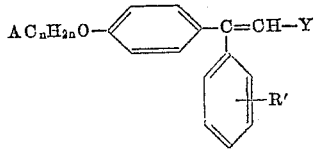

in which A is a member of the group consisting of diloweralkylamino, piperidino, and morpholino, n is an integer from 2 to 4, R' is a member of the group consisting of hydrogen, lower alkyl, halogen, lower alkoxy and trifluoromethyl and Y is a radical of the group consisting of alkyl and alkenyl having from two to fifteen carbon atoms.

3. A compound of the formula:

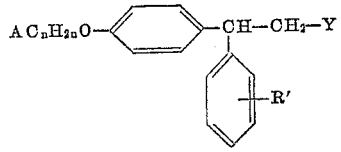

in which A is a member of the group consisting of diloweralkylamino, piperidino, and morpholino, n is an integer from 2 to 4, R' is a member of the group consisting of hydrogen, lower alkyl, halogen, lower alkoxy and trifluoromethyl and Y is a radical of the group consisting of alkyl and alkenyl having from two to fifteen carbon atoms.

4. 1-[p-(β-diethylaminoethoxy)phenyl]-1-p-tolylheptanol.
5. 1-[p-(β-diethylaminoethoxy)phenyl]-1-p-tolylpentanol.
6. 1-[p-(β-diethylaminoethoxy)phenyl]-1-p-chlorophenyl-4-methyl-1-pentanol.
7. 1-[p-(β-diethylaminoethoxy)phenyl]-1-p-methoxyphenyloctanol.
8. 1-[p-(β-diethylaminoethoxy)phenyl]-1-p-tolylheptene-1.

References Cited in the file of this patent

UNITED STATES PATENTS 2,768,207    Cheney et al.            Oct. 23, 1956

OTHER REFERENCES

Benoit et al.: Bulletin de la Societe Chimique de France (1951), pages 890–894.